Sept. 22, 1936.  F. G. HOUGH  2,055,011
SWEEPER
Filed Sept. 19, 1934   2 Sheets-Sheet 2
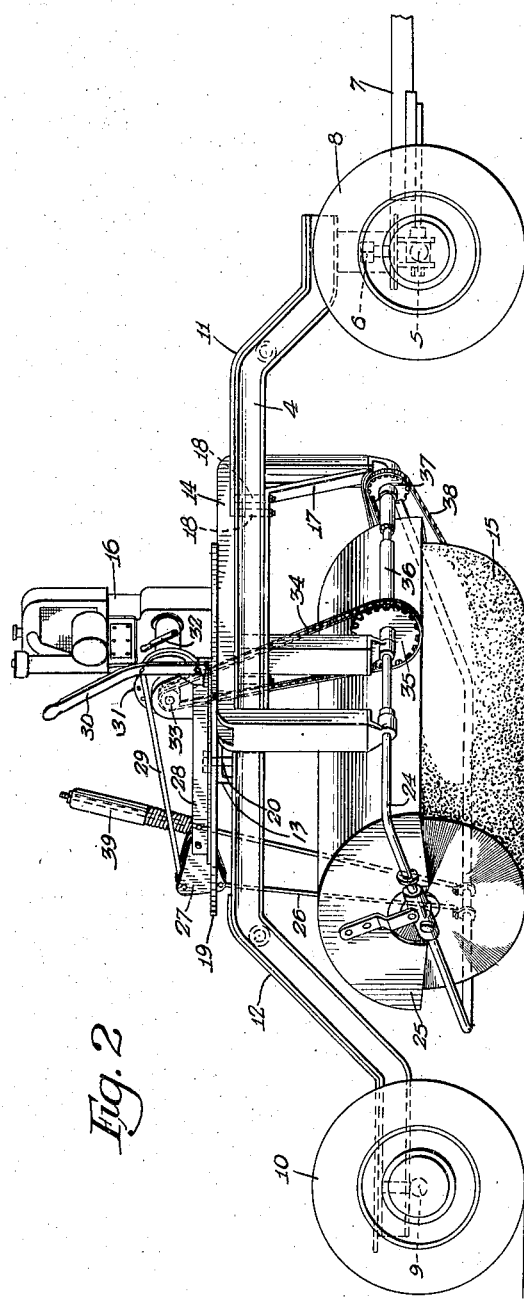
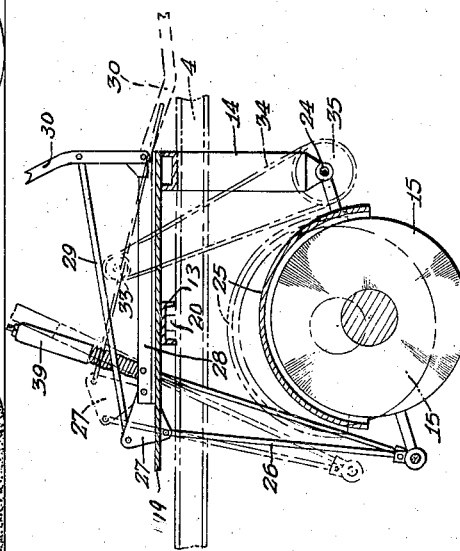
Inventor:
Frank G. Hough
By: Wm O. Belt
Atty.

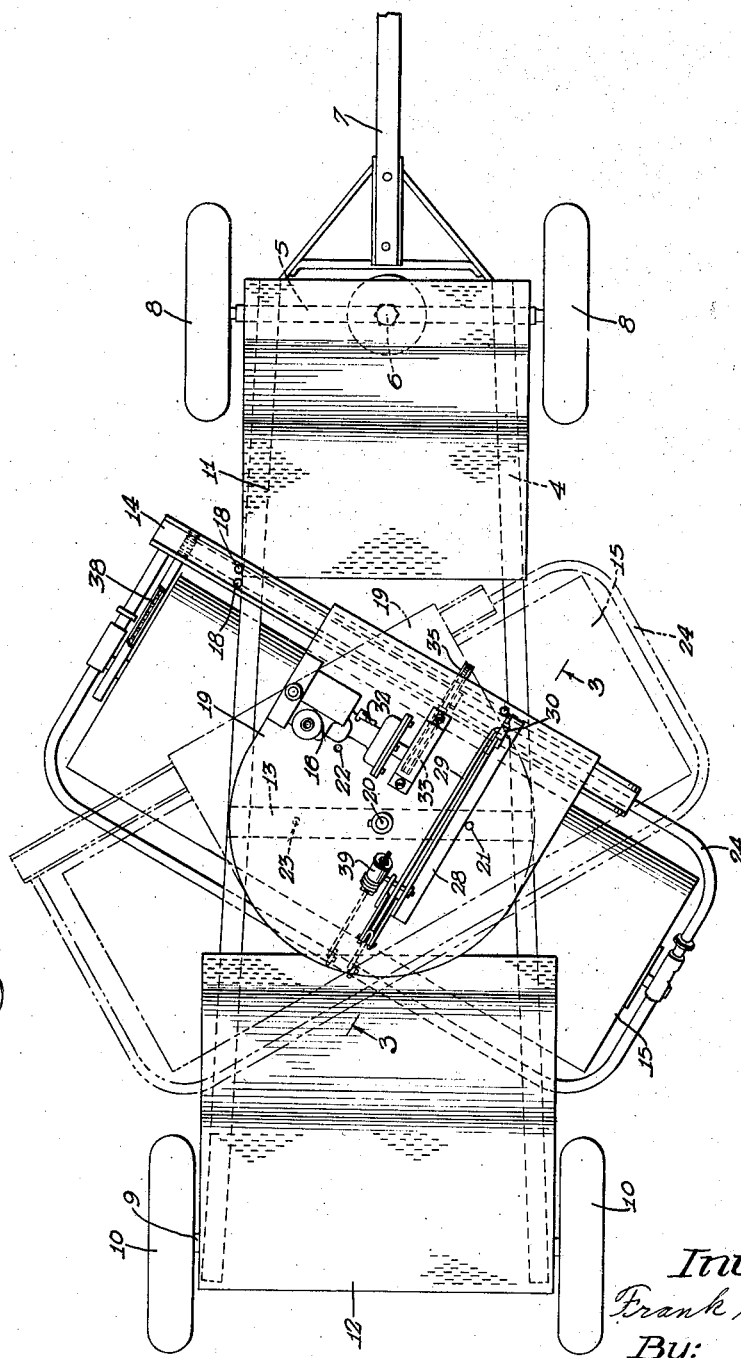

Patented Sept. 22, 1936

2,055,011

UNITED STATES PATENT OFFICE 2,055,011

SWEEPER

Frank G. Hough, Chicago, Ill.

Application September 19, 1934, Serial No. 744,627

6 Claims. (Cl. 15—82)

This invention relates to sweepers of the type having a rotatable brush and which are used for sweeping and cleaning road surfaces.

Heretofore brush sweeping mechanisms have been constructed as attachments to be mounted on tractors, trucks, or other vehicles used in road work and so long as the attachments remained on the vehicle the vehicle was useless for other purposes. It is often desired to use the vehicles to which such an attachment is connected for other purposes which necessitates removing the attachment and then replacing it when sweeping operation is to be resumed. Even though the attachments were detachable considerable time and labor were wasted in removing and replacing the attachments.

Trailers including a sweeping mechanism have also been used for road sweeping and cleaning but in such devices the brush has generally been driven from the wheels of the tractor and when the sweeping became heavy the brush slowed down and this occurred at a time when brush operation was really most essential.

Therefore, the primary obect of my invention is to provide a unitary device in the form of a trailer or the like and including sweeping mechanism propelled independently of the movement of the device over the surface to be swept.

In the trailer type of equipment as heretofore used the brush has generally been arranged to sweep to one side only of the trailer and it has been the custom to sweep a portion of the surface and to then back-track and sweep another portion and so on until the entire surface has been cleaned. The back-tracking consumed considerable time and no useful work could be done during this time. Back-tracking without doing work can be avoided by constructing the brush to sweep to either side of the trailer, and another important object of my invention is to so mount the brush of a sweeping mechanism that it can be arranged to sweep to one side or the other of the mechanism as desired, and other objects are to accurately locate the brush in its alternate positions and to retain the brush in the position into which it is moved.

It is a further object of the invention to provide a road sweeper constituting a trailer having a source of power independent of the traction means of the trailer for selectively revolving the brush and wherein the brush is adapted to sweep to either side of the trailer selectively.

In the accompanying drawings I have illustrated a selected embodiment of the invention and referring thereto:—

Fig. 1 is a plan view showing the brush in position to sweep to the right in full lines and in position to sweep to the left in broken lines;

Fig. 2 is a side elevation; and

Fig. 3 is a sectional view on the line 3—3 of Fig. 1.

In the machine illustrated, a main frame 4 is supported at one end on an axle 5 pivoted thereto at 6. A shaft 7 is affixed to the axle and adapted to be removably attached to a truck, tractor or other means for pulling the sweeper and the axle 5 has wheels 8 at each end thereof. The rear end of the frame is supported on an axle 9 having wheels 10 at the ends thereof. Platforms 11 and 12 are mounted on the frame to enable an attendant to mount thereon when necessary, and a cross member 13 extends from one side of the frame to the other approximately midway between the ends thereof. A sub-frame for carrying the brush 15 and engine, generally designated as 16, comprises a channel iron member 14 extending transversely over the main frame 4 beyond the sides thereof and bent downwardly at its ends and a brace bar 17 affixed to the ends of the channel iron member 14 and extending transversely beneath the main frame 4 from side to side thereof, which structure constitutes a support for a brush carrying bar 24. The brace bar and channel iron member are secured together by spacer bolts 18. The sub-frame also has an engine bed plate 19 affixed to the top of the channel iron member, which bed plate has a pivot bolt 20 extending therethrough and through an opening in the cross member 13. The entire sub-frame, brush, and engine, pivot about the pivot bolt 20, and the spacer bolts 18 constitute stops for limiting the pivotal movement of the sub-frame by engagement of the bolts with the main frame. A lock pin 21 may be inserted through openings in the bed plate and cross member 13 to lock the sub-frame in the position shown in full lines in Figs. 1 and 2 and may be placed in the opening 22 in the bed plate and opening 23 in the cross member to lock the sub-frame in the position shown in broken lines in Fig. 1. The brush carrying bar 24 is pivotally mounted in the ends of the channel iron member 14 of the sub-frame, and the axle for the brush 15 is carried by adjustable bearings on the carrying bar 24. A hood 25 is provided over the brush 15 to confine the dust thrown off from the brush. A rod 26 extends upwardly from the carrying bar 24 opposite the pivot therefor and connects with a bell crank 27 pivoted on an angle iron 28 mounted on the bed plate. Another rod 29 extends from the bell crank to a hand lever 30 which is also pivoted to the angle iron 28. Moving the lever 30 to the right, Fig. 3, to an over-center position will operate the bell crank to raise the brush from contact with the road surface, as shown in broken lines. It is held in this position while being transported to the location where the sweeper is to be put to use by the over-center position of the lever.

The engine 16 is equipped with a clutch 31 and clutch operating lever 32 and a sprocket 33 on the driven end of the clutch. A chain 34 connects the sprocket 33 and a sprocket 35 mounted on a drive sleeve 36, which sleeve rotates about a portion of the carrying bar 24. Another sprocket 37 is affixed to the drive sleeve 36 at the end thereof on one side of the sweeper and a chain 38 connects the sprocket 37 with another sprocket on the brush axle. The brush receives its rotative motion from the engine through sprocket 33, chain 34, sleeve 36, sprocket 37 and chain 38. The brush may be run at any speed by regulating the speed of the engine and may be connected and disconnected at will from the engine by means of the clutch operating lever 32. A bumper or shock absorbing device 39 may be provided to relieve the strains on the brush caused by irregularities of the road surface and for limiting the downward movement of the brush.

My sweeper provides one that does not constitute an attachment to be rigidly attached to another piece of road working equipment but can be engaged with or disengaged from a traction means instantly and does not "tie-up" the traction equipment and thereby prevent it from performing other work. The brush is driven independently and can be regulated to revolve at whatever speed best suits the road condition and is not dependent upon the ground speed of the sweeper. If the ground speed of the sweeper is fast the speed of the brush may be reduced to compensate therefor and if the ground speed is slow, as for instance when it is drawn by a slow moving tractor or horses, the speed of rotation of the brush may be increased at will to compensate for the slow ground speed of the sweeper. If it is desired at any time to use the brush as a stationary brush instead of as a revoluble brush, this may be accomplished in a number of ways as, for instance, turning the engine off and leaving the clutch engaged whereby the compression of the engine will prevent rotation of the brush, or a pin may be inserted in a link of one of the chains to prevent the link from engaging the teeth of the sprockets. The sweeper can be drawn by horses or by mechanical means and consequently fulfills the terms of contracts calling for either method of sweeping. The brush is suspended between two front wheels and two rear wheels and consequently has a leveling effect and the angle of the brush can be instantly changed to sweep either to the right or to the left. The sweeper can be used for spreading or thoroughly leveling gravel and aggregates, and the clutch member may be disengaged to permit the brush to roll over loose aggregates without a sweeping action.

The invention may be adapted for devices of many different forms and for many different purposes and I do not limit it to the forms herein shown and described but reserve the right to use it in any form and for any purpose for which it is or may be adapted within the scope of the following claims.

I claim:

1. In a road sweeper, a wheeled frame, a sub-frame mounted on the wheeled frame, a rotary brush, an engine on the sub-frame operatively connected to said brush for imparting rotative movement thereto independent of the rate of travel of said wheeled frame during the travel thereof, and means pivotally connected to the sub-frame and carrying said brush whereby the brush may move substantially vertically and relative to the engine to follow the contour of the road being swept.

2. In a road sweeper, a wheeled frame, a sub-frame mounted on the wheeled frame for selective movement about a vertical axis, means retaining the sub-frame in selected positions about the vertical axis, a rotary brush, power means on said sub-frame operatively connected to said brush for imparting rotative movement thereto independent of the rate of travel of said wheeled frame during the travel thereof, and means pivotally connected to the sub-frame and carrying said brush whereby the brush may move substantially vertical and relative to the engine to follow the contour of the road being swept.

3. In a road sweeper, a wheeled frame, a sub-frame mounted on the wheeled frame for movement about a vertical axis, an engine on the sub-frame, carrying means pivotally mounted in the sub-frame for movement about a horizontal axis, a brush mounted in the carrying means and movable therewith relative to the sub-frame, engine and road, power transmitting means on the carrying means and connected to said engine for imparting rotative movement to said brush independent of the rate of travel of said wheeled frame during the travel thereof, and means for retaining the sub-frame in selective positions about said vertical axis whereby the brush may be positioned to sweep in selective directions.

4. In a road sweeper, a wheeled frame, a sub-frame mounted on the wheeled frame, a rotary brush, a bed plate mounted on the sub-frame, an engine on the bed plate operatively connected to said brush for imparting rotative movement thereto, and means pivotally connected to the sub-frame and carrying said brush whereby the brush may move substantially vertically and relative to the bed plate and engine to follow the contour of the road being swept.

5. In a road sweeper, a wheeled frame, a sub-frame mounted on the wheeled frame, a rotary brush, a bed plate mounted on the sub-frame, an engine on the bed plate operatively connected to said brush for imparting rotative movement thereto, means pivotally connecting the bed plate to the main frame for selective movement of the engine, sub-frame and brush as a unit to adjust the direction of sweeping of the brush, and means pivotally connected to the sub-frame and carrying said brush whereby the brush may move substantially vertically and relative to the bed plate and engine to follow the contour of the road being swept.

6. In a road sweeper, a wheeled frame, a sub-frame mounted on the wheeled frame, a rotary brush, a bed plate mounted on the sub-frame, an engine on the bed plate operatively connected to said brush for imparting rotative movement thereto, means pivotally connecting the bed plate to the main frame for selective movement of the engine, sub-frame and brush as a unit to adjust the direction of sweeping of the brush, means retaining the sub-frame and brush in selected positions, and means pivotally connected to the sub-frame and carrying said brush whereby the brush may move substantially vertically and relative to the bed plate and engine to follow the contour of the road being swept.

FRANK G. HOUGH.